United States Patent
Liu

(10) Patent No.: US 11,602,899 B2
(45) Date of Patent: Mar. 14, 2023

(54) EFFICIENT SURFACE TEXTURING OF OBJECTS PRODUCED BY ADDITIVE MANUFACTURING

(71) Applicant: Carbon, Inc., Redwood City, CA (US)

(72) Inventor: Ruwen Liu, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 322 days.

(21) Appl. No.: 16/760,114

(22) PCT Filed: Oct. 23, 2018

(86) PCT No.: PCT/US2018/056968
§ 371 (c)(1),
(2) Date: Apr. 29, 2020

(87) PCT Pub. No.: WO2019/089269
PCT Pub. Date: May 9, 2019

(65) Prior Publication Data
US 2020/0331207 A1  Oct. 22, 2020

Related U.S. Application Data

(60) Provisional application No. 62/579,342, filed on Oct. 31, 2017.

(51) Int. Cl.
*B33Y 50/02* (2015.01)
*B29C 64/393* (2017.01)
(Continued)

(52) U.S. Cl.
CPC ............ *B29C 64/393* (2017.08); *G06F 30/20* (2020.01); *G06T 15/04* (2013.01); *G06T 17/10* (2013.01);
(Continued)

(58) Field of Classification Search
CPC ..................................................... B33Y 50/02
See application file for complete search history.

(56) References Cited

U.S. PATENT DOCUMENTS 4,785,075 A   11/1988   Shimp
5,231,668 A    7/1993   Kravitz
(Continued)

FOREIGN PATENT DOCUMENTS

CN   204149536 U   *   2/2015
WO   2015/164234      10/2015
(Continued)

OTHER PUBLICATIONS

International Search Report and Written Opinion corresponding to PCT/US2018/056968, dated Jan. 21, 2019 (10 pp).

(Continued)

*Primary Examiner* — Suresh Suryawanshi
(74) *Attorney, Agent, or Firm* — Myers Bigel, P.A.

(57) ABSTRACT

A method of making a three-dimensional object from an object geometry data file that includes (a) slicing said object geometry data file to produce a rasterized image sequence file; (b) generating a signed distance field from said object geometry data file; (c) selecting, from a library of procedural texture functions, a procedural texture function defining a continuous internal or external set of features; (d) modifying said rasterized image sequence to include said internal or external set of features based on said signed distance field to thereby produce a modified image sequence file; and then (e) producing said three-dimensional object by additive manufacturing from said modified image sequence file, said three-dimensional object having said selected internal feature included therein and/or external feature included thereon.

20 Claims, 2 Drawing Sheets

(51) Int. Cl.
*G06F 30/20* (2020.01)
*G06T 15/04* (2011.01)
*G06T 17/10* (2006.01)
*G06T 19/20* (2011.01)
*G06F 113/10* (2020.01)

(52) U.S. Cl.
CPC ............ *G06T 19/20* (2013.01); *B33Y 50/02* (2014.12); *G06F 2113/10* (2020.01)

(56) References Cited

U.S. PATENT DOCUMENTS

| | | |
|---|---|---|
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 6,788,304 B1 | 9/2004 | Hart et al. |
| 7,438,846 B2 | 10/2008 | John |
| 7,626,590 B2 | 12/2009 | Ahn et al. |
| 7,892,474 B2 | 2/2011 | Shkolnik et al. |
| 8,110,135 B2 | 2/2012 | El-Siblani |
| 8,111,126 B2 | 2/2012 | Li et al. |
| 8,350,855 B2 | 1/2013 | Van Horn, III et al. |
| 8,593,475 B2 | 11/2013 | Smithers et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 9,794,270 B2 | 10/2017 | Lindteigen |
| 2006/0170696 A1 | 8/2006 | Ahn et al. |
| 2012/0069037 A1 | 3/2012 | Ziemski |
| 2013/0295212 A1 | 11/2013 | Chen et al. |
| 2015/0314039 A1* | 11/2015 | Dean ............... B29C 64/129 522/18 |
| 2016/0136898 A1* | 5/2016 | Jang ............... H04N 1/644 700/98 |
| 2017/0015057 A1* | 1/2017 | Stevens ............... B29C 64/386 |
| 2018/0040131 A1* | 2/2018 | Zeng ............... G06T 1/20 |
| 2018/0240263 A1* | 8/2018 | Courter ............... G06T 15/08 |

FOREIGN PATENT DOCUMENTS

| | | |
|---|---|---|
| WO | 2016/133759 | 8/2016 |
| WO | 2016/145182 | 9/2016 |

OTHER PUBLICATIONS

Janusziewcz et al. "Layerless fabrication with continuous liquid interface production" Proceedings of the National Academy of Sciences USA, 113(42):11703-11708 (2016).

Tubleston et al. "Continuous liquid interface production of 3D objects" Science, 347(6228):1349-1352 (2015).

Saito et a. "New algorithms for euclidean distance transformation of an n-dimensional digitized picture with applications" Pattern Recognition, 27(11): 1551-1565 (1994).

Jones et al. "3D distance fields: a survey of techniques and applications" IEEE Transactions on Visualization and Computer Graphics, 12(4):581-599 (2006).

Perlin, K. "Improving Noise" SIGGRAPH02: The 29th International Conference on Computer Graphics and Interactive Techniques San Antonio Texas, Jul. 2002; pp. 681-682.

* cited by examiner

EFFICIENT SURFACE TEXTURING OF OBJECTS PRODUCED BY ADDITIVE MANUFACTURING

RELATED APPLICATION

This application is a 35 U.S.C. § 371 national phase application of International Application Serial No. PCT/US2018/056968, filed Oct. 23, 2018, which claims priority to U.S. Provisional Application Ser. No. 62/579,342, filed Oct. 31, 2017, the entire contents of which are hereby incorporated by reference.

FIELD OF THE INVENTION

The present invention concerns additive manufacturing in general, and particularly concerns stereolithography methods such as continuous liquid interface production.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., "Continuous liquid interface production of 3D objects," *Science* 347, 1349-1352 (published online 16 Mar. 2015); see also Rolland et al., U.S. Pat. Nos. 9,676,963, 9,453,142, and 9,598,606).

Objects produced by additive manufacturing for real-world use, beyond prototyping, often require surface features such as texture, and/or internal features such as lattices, to make them functionally or commercially acceptable. Unfortunately, the addition of such features in the context of additive manufacturing can be slow and computationally intensive. Accordingly, new approaches to providing internal and external features to additively manufactured products are required.

SUMMARY OF THE INVENTION

Various embodiments described herein provide a method of making a three-dimensional object from an object geometry data file that includes (a) slicing said object geometry data file to produce a rasterized image sequence file; (b) generating a signed distance field from said object geometry data file; (c) selecting, from a library of procedural texture functions, a procedural texture function defining a continuous internal or external set of features; (d) modifying said rasterized image sequence to include said internal or external set of features based on said signed distance field to thereby produce a modified image sequence file; and then (e) producing said three-dimensional object by additive manufacturing from said modified image sequence file, said three-dimensional object having said selected internal feature (e.g., lattice structure) included therein and/or external feature (e.g., surface texture) included thereon.

In some embodiments, said producing step (e) is carried out with a dual cure light polymerizable resin, and said method further includes the step of washing said object, and then further curing (e.g., by heating) said object.

In some embodiments, said library of procedural texture functions includes solid texturing functions (e.g., simplex noise, Perlin noise, stochastic textures, etc.), cellular texturing functions, genetic texturing functions, self-organizing texture functions, and combinations thereof.

In some embodiments, said object geometry data file includes a polysurface file (e.g., an .iges file) or a boundary representation (BREP) file (e.g., a .stl, .obj, .ply, .3mf, .amf, or .mesh file).

In some embodiments, said rasterized image sequence file and said modified image sequence file each include a raster graphics file (e.g., a GIF, JPEG, or PNG file).

In some embodiments, said object is comprised of a polymer and said producing step is carried out by stereolithography, preferably by continuous liquid interface production.

In some embodiments, said slicing, generating, and modifying steps are all carried out in a computer processor.

In some embodiments, said object geometry data file is input by a local user, said library of feature files is input at least in part by a remote provider (e.g., over the Internet), and said object geometry data file is inaccessible to said remote provider (e.g., via operation of a cryptographic hash function.

In some embodiments, said object geometry data file does not include surface texture.

In some embodiments, said object geometry data file does not include internal features or structure (e.g., lattice structure).

In some embodiments, said signed distance field includes a negative value (for addition of surface features such as texture) or a positive value (for additional of internal features such as voids/lattices), or the inverse thereof.

Various embodiments described also provide an additive manufacturing system including (a) an additive manufacturing apparatus (e.g., a bottom up stereolithography apparatus, such as a continuous liquid interface production apparatus); (b) a processing device; and (c) a memory comprising instructions which, when executed by the processing device, cause the processing device to carry out the method embodiments described herein with said additive manufacturing apparatus.

Various embodiments described also provide a computer program product including a non-transitory computer readable storage medium having computer readable software code sections embodied in the medium, which software code sections are configured to carry out the method embodiments described herein.

"Surface Skins™: Make your products say 'touch me'" (Lehrmitt Associates, 2016) describes the conversion of a PSD (PHOTOSHOP-based) format, Portable Network Graphics (PNG) format, or Joint Photographic Experts Group (JPEG) format image file of a texture taken from a library of files to a new CAD file that is wrapped around a product. The Surface Skins™ product appears adapted to generating prototypes having surface texture, which surface textures can then be imparted by the provider through the use of their texture files to the customer's production-ready mold. In contrast, in the present invention, new CAD files are not created, the CAD files (or the like) remain with the customer/user, and the customer/user imparts the texture to their products at the time of additive manufacture, without use of a production-ready mold.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
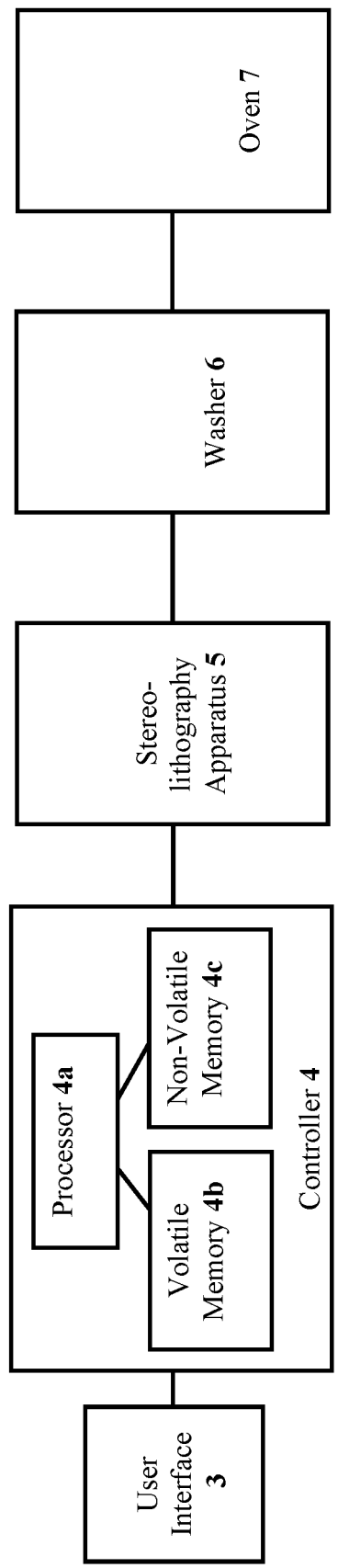
FIG. 1 schematically illustrates a non-limiting example of an apparatus of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Production by Additive Manufacturing (Overview).

Numerous polymerizable liquids (or "resins") for use in additive manufacturing are known and can be used in carrying out the present invention. See, e.g., U.S. Pat. No. 9,205,601 to DeSimone et al.

In some embodiments, the resin is a dual cure resin. Such resins are described in, for example, Rolland et al., U.S. Pat. Nos. 9,676,963; 9,598,606; and 9,453,142, the disclosures of which are incorporated herein by reference. Resins may be in any suitable form, including "one pot" resins and "dual precursor" resins (where cross-reactive constituents are packaged separately and mixed together before use, and which may be identified as an "A" precursor resin and a "B" precursor resin). Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, Calif. 94063 USA.

Note that, in some embodiments employing "dual cure" polymerizable resins, the part, following manufacturing, may be contacted with a penetrant liquid, with the penetrant liquid carrying a further constituent of the dual cure system, such as a reactive monomer, into the part for participation in a subsequent cure. Such "partial" resins are intended to be included herein.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Pat. No. 9,636,873 to Joyce, and U.S. Pat. No. 9,120,270 to Chen et al. The disclosures of these patents are incorporated by reference herein in their entirety.

In some embodiments, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., "Continuous liquid interface production of 3D Objects," *Science* 347, 1349-1352 (published online 16 Mar. 2015). See also R. Janusziewcz et al., "Layerless fabrication with continuous liquid interface production," *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, which may be an optically transparent member, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). In some embodiments it is then further cured, preferably by heating (although further curing may in some embodiments be concurrent with the first cure, or may be by different mechanisms such as contacting to water, as described in U.S. Pat. No. 9,453,142 to Rolland et al.).

2. Washing and Further Curing (Overview).

Objects as described above can be washed in any suitable apparatus, preferably with a wash liquid as described above.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected in based, in part, on their environmental and health impact (see, e.g., GSK Solvent Selection Guide 2009). In some embodiments, the wash liquid comprises a hydrofluorocarbon, hydrochlorofluorocarbon, or hydrofluoroether solvent, such as 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Any suitable wash apparatus can be used, including but not limited to a Carbon Inc. SMART WASHER™, available from Carbon, Inc., Redwood City, Calif., USA.

After washing, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075 to Shimp.)

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007 to Williams, et al.).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

3. Systems and Apparatus.

The foregoing can be combined into apparatus and methods for carrying out the present invention, as first schematically illustrated in FIG. 1. Such an apparatus includes a user interface 3 for inputting instructions (such as selection of an object to be produced, and selection of features to be added to the object), a controller 4, and a stereolithography apparatus 5 such as described above. An optional washer 6 can be included in the system if desired, or a separate washer can be utilized. Similarly, for dual cure resins, an oven 7 can be included in the system, although a separate oven can also be utilized.

Connections between components of the system can be by any suitable configuration, including wired and/or wireless connections. The components may also communicate over one or more networks, including any conventional, public and/or private, real and/or virtual, wired and/or wireless network, including the Internet.

The controller 4 may be of any suitable type, such as a general-purpose computer. Typically the controller will include at least one processor 4a, a volatile (or "working") memory 4b, such as random-access memory, and at least one non-volatile or persistent memory 4c, such as a hard drive or a flash drive. The controller 4 may use hardware, software implemented with hardware, firmware, tangible computer-readable storage media having instructions stored thereon, and/or a combination thereof, and may be implemented in one or more computer systems or other processing systems. The controller 4 may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one processor 4a of the controller 4 may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C #, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor 4a may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such, or similar devices, which may be collocated or distributed across one or more data networks.

Connections between internal components of the controller 4 are shown only in part and connections between internal components of the controller 4 and external components are not shown for clarity, but are provided by additional components known in the art, such as busses, input/output boards, communication adapters, network adapters, etc. The connections between the internal components of the controller 4, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Advanced Technology Attachment (ATA) bus, a Serial ATA (SATA) bus, and/or an Institute of Electrical and Electronics Engineers (IEEE) standard 1394 bus, also called "Firewire."

The user interface 3 may be of any suitable type. The user interface 3 may include a display and/or one or more user input devices. The display may be accessible to the at least one processor 4a via the connections between the system components. The display may provide graphical user interfaces for receiving input, displaying intermediate operation/data, and/or exporting output of the methods described herein. The display may include, but is not limited to, a monitor, a touch screen device, etc., including combinations thereof. The input device may include, but is not limited to, a mouse, keyboard, camera, etc., including combinations thereof. The input device may be accessible to the at least one processor 4a via the connections between the system components. The user interface 3 may interface with and/or be operated by computer readable software code instructions resident in the volatile memory 4b that are executed by the processor 4a.

4. Texturing Methods.

Figure 2:
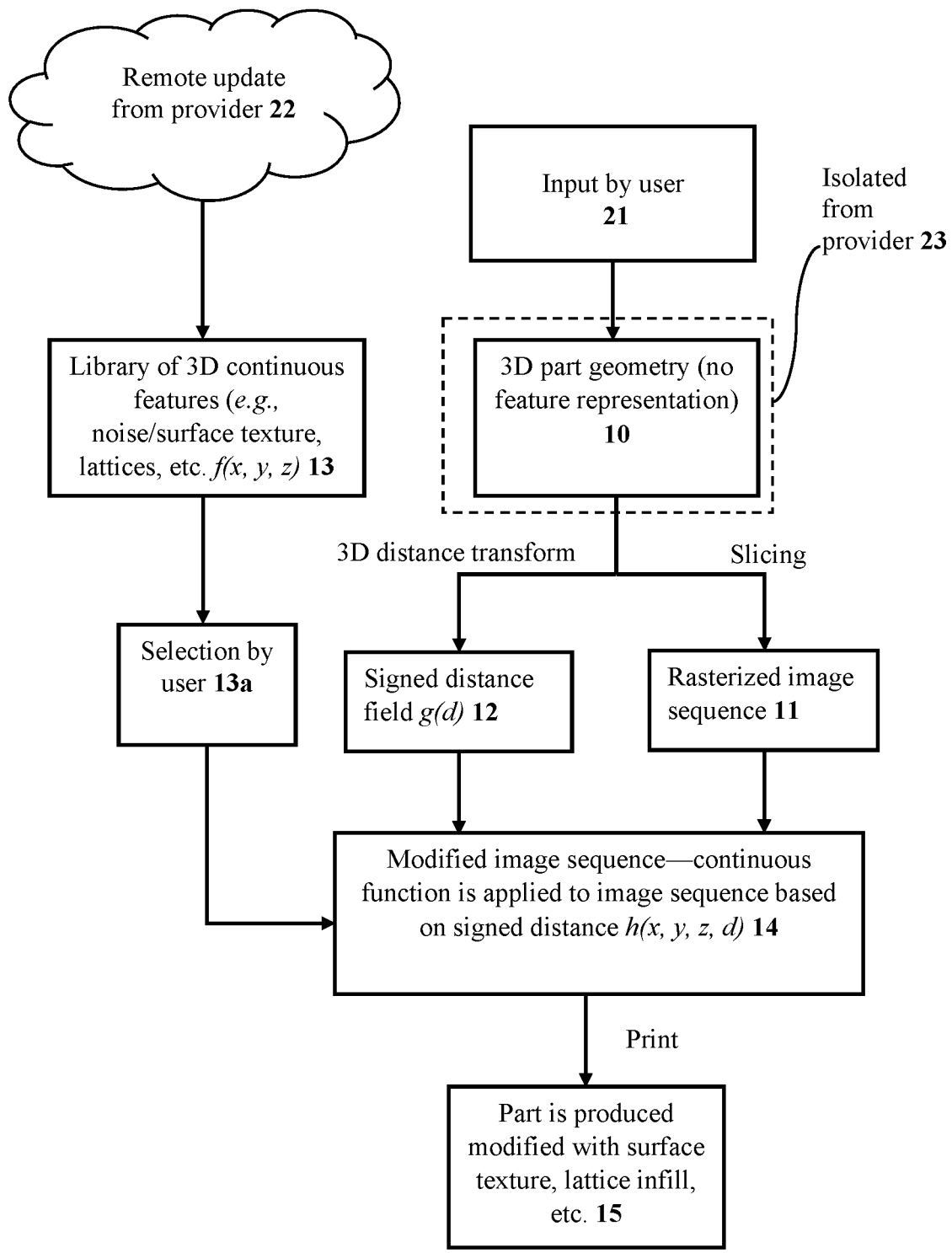
FIG. 2 schematically illustrates a non-limiting example of a method of the present invention.

A non-limiting example of a method of carrying out the present invention is schematically illustrated in FIG. 2. In overview, the method produces a three-dimensional (3D) object from an object geometry data file 10. The 3D object that is produced is a real object that is physical and tangible. The method may utilize an additive manufacturing system such as, for example, the system illustrated in FIG. 1. The object geometry data file 10 may be provided via input 21 by a user of the additive manufacturing system. In some embodiments, the input 21 may be provided by a user, for example, via a computer network, local input, and/or local storage to the controller 4 (see FIG. 1). The object geometry data file 10 may describe a geometry of a 3D part. In some embodiments, the object geometry data file 10 may include a polysurface file (e.g., an .iges file) or a boundary representation (BREP) file (e.g., a .stl, .obj, .ply, .3mf, .amf, or .mesh file). A difference between the 3D part described by the object geometry data file 10 and the 3D object produced by the method illustrated in FIG. 2 may include a 3D continuous feature incorporated from a library of a provider utilizing the method described herein. For example, the 3D part described by the object geometry data file 10 may not include an external feature, like a surface texture, and/or an internal feature, like a lattice structure, which may subsequently be added to the manufactured 3D object, in part, by a procedural texture feature of the provider library.

The object geometry data file 10 is sliced to produce a rasterized image sequence file 11. In some embodiments, the rasterized image sequence may include one or more images used to control the additive manufacturing of the 3D part. Concurrently, or in any sequence, with respect to producing the rasterized image sequence file 11, a signed distance field 12 may be generated from the object geometry data file 10. The rasterized image sequence file 11 may include one or more rasterized images for use by the additive manufacturing system in constructing the 3D object such as, for example, one or more raster graphics files (e.g., a GIF, JPEG, or PNG file). The signed distance field 12 represents, for points in space, the signed distance from that point to the 3D object, such that the distance field 12 is an implicit representation of the shape of the 3D object. The step of generating a signed distance field 12 can be carried out in accordance with known techniques, including but not limited to those given in Saito, T. and Toriwaki, J. I., *New algorithms for euclidean distance transformation of an n-dimensional digitized picture with applications*. Pattern recognition, 27(11), 1551-1565 (1994); and Jones, M. W., Baerentzen, J. A. and Sramek, M., 3*D distance fields: A survey of techniques and applications*. IEEE Transactions on visualization and Computer Graphics, 12(4), 581-599 (2006). In some embodiments, the signed distance field may include a negative value for addition of surface features such as texture or a positive value (for additional of internal features such as voids/lattices), though the present invention is not limited thereto. For example, in some embodiments, the signed distance field may include a positive value for addition of surface features such as texture or a negative value (for additional of internal features such as voids/lattices).

Before or after producing the rasterized image sequence file 11 and/or generating the signed distance field 12, the user selects 13a, from a library or plurality (that is, two or more) of procedural texture functions 13, at least one particular procedural texture function defining a continuous internal or external set of features. In some embodiments, the at least one procedural texture function may define a transformation to be performed on the 3D part defined by the object geometry data file 10. For example, the procedural texture function may describe a feature to be added to the 3D part not present within the object geometry data file 10 to generate the 3D object. That is to say that the procedural texture function may define a feature to be applied to the 3D part to generate the desired 3D object having a selected internal feature (e.g., lattice structure) included therein and/or an external feature (e.g., surface texture) included thereon. For example, in some embodiments, the at least one procedural texture function may define an external characteristic to be added to the 3D part. For example, the external characteristic may be a surface texture to be applied to a surface of the 3D part. It will be understood that a surface texture may include a texture that occupies all, or only part of, an external surface of the 3D part. In some embodiments, the at least one procedural texture function may define an internal characteristic to be added to the 3D part. For example, the internal characteristic may be a lattice to be applied to some portion of the internal space of the 3D part. In some embodiments, an internal lattice may be incorporated into one or more voids within the 3D part. In some embodiments, an internal lattice may replace solid portions within the 3D part. As noted herein, the selection by the user 13a may include more than one procedural texture function. For example, the user may select 13a an internal and an external feature, more than one internal feature, more than one external feature, or various combinations thereof.

Responsive to the selection by the user 13a, the rasterized image sequence 11 is then modified to include the internal and/or external set of features based on the signed distance field 12 to thereby produce a modified image sequence file 14. The modified image sequence file 14 may include a raster graphics file (e.g., a GIF, JPEG, or PNG file). The modified image sequence file 14 may be used to produce the 3D object by additive manufacturing 15, with the 3D object having the selected internal feature (e.g., lattice structure) included therein and/or the selected external feature (e.g., surface texture) included thereon. The 3D object may be manufactured to include, in part, a polymer, such as those described herein. In some embodiments, the additive manufacturing may be carried out by stereolithography, preferably by CLIP.

The library of procedural texture functions 13 (which can be provided in software from a provider, and updated periodically by the provider, such as by a push update 22 over the Internet from the provider to the controller 4), can include any of a variety of procedural texture functions, such as solid texturing functions (e.g., simplex noise, Perlin noise, stochastic textures, etc.), cellular texturing functions, genetic texturing functions, self-organizing texture functions, and combinations thereof. Numerous variations are known and particular examples include but are not limited to those given in: Ebert, D. S., *Texturing & modeling: a procedural approach* (Morgan Kaufmann 2003); Perlin, K., *Improving noise*. In ACM Transactions on Graphics (TOG) 21 (3) 681-682 (2002); Ahn, J. et al., Method and apparatus for generating procedural texture for natural phenomenon and recording medium storing the method, U.S. Pat. No. 7,626,590 (2009); Hart, J. et al., Methods and system for antialiased procedural solid texturing, U.S. Pat. No. 6,788,304 (2004); Van Horn, R. and Turk, G., Systems and methods of reducing anti-aliasing in procedural texture, U.S. Pat. No. 8,350,855 (2013); Smithers, A. et al., Systems and methods for dynamic procedural texture generation management, U.S. Pat. No. 8,593,475 (2013); Perlin, K., Method and apparatus for noise, U.S. Pat. No. 811,126 (2012).

Operation 14 can be carried out with a blending function that blends the results of the signed distance field 12 and the procedurally generated feature (e.g., surface texture and/or lattice). In some embodiments, the blending function may operate on the rasterized image sequence 11 using the signed distance field 12 to generate a modified image sequence. For example, for a procedural texture function that includes a lattice definition, at least some of the operation may include:

```
if (deepest pixel value > 4)
    write the value of the lattice
else
    write the value of the original part
```

Depending on particular needs, the blending function can be implemented as a simple thresholding operation as shown above, as a weighted average of both lattice and part, and/or as a more involved computation. The blending function can be run on each individual pixel of the rasterized image sequence 11. It can be implemented as a small memory operation that depends on the values of three images (a distance transform image, a part slice image, and a lattice image) which may then written to the final output image. In some embodiments, the final output image may be used to produce the modified 3D object 15.

In some embodiments, the user's object geometry data file 10 may be isolated 23 from the provider of the library of procedural texture functions. Such isolation may protect the object geometry data file 10 of the user, which may contain proprietary information, from the provider while still allowing the user access to the features of the provider's library. Isolation and/or protection 23 of the user's object geometry data file 10 from the provider (or others that may attempt to access the controller 4) can be carried out by any suitable technique, such as by inclusion of a cryptographic hash function (e.g., SHA-3) in the controller 4. See generally D. Kravitz, Digital signal algorithm, U.S. Pat. No. 5,231,668 (1993); see also T. Lindteigen, Data security and integrity by remote attestation, U.S. Pat. No. 9,794,270 (2017). In some embodiments, the cryptographic functionality may encrypt the object geometry data file 10 to protect the object geometry data file 10 from unauthorized access.

The foregoing is illustrative of the present invention, and is not to be construed as limiting thereof. The invention is defined by the following claims, with equivalents of the claims to be included therein.

I claim:

1. A method of making a three-dimensional object from an object geometry data file, comprising:
   (a) slicing said object geometry data file to produce a rasterized image sequence;
   (b) generating a signed distance field from said object geometry data file;
   (c) selecting, from a library of procedural texture functions, a procedural texture function defining a continuous internal or external set of features;
   (d) modifying said rasterized image sequence to include said internal or external set of features based on said signed distance field to thereby produce a modified image sequence file;
   and then
   (e) producing said three-dimensional object by additive manufacturing from said modified image sequence file, said three-dimensional object having said selected internal feature included therein and/or external feature included thereon.

2. The method of claim 1, wherein said producing step (e) is carried out with a dual cure light polymerizable resin, and said method further comprises the step of:
(f) washing said object, and then
(g) further curing said object.

3. The method of claim 1, wherein said library of procedural texture functions comprises solid texturing functions, cellular texturing functions, genetic texturing functions, self-organizing texture functions, and combinations thereof.

4. The method of claim 1, wherein said object geometry data file comprises a polysurface file or a boundary representation (BREP) file.

5. The method of claim 1, wherein said rasterized image sequence and said modified image sequence file each comprise a raster graphics file.

6. The method of claim 1, wherein said object is comprised of a polymer and said producing step is carried out by stereolithography, preferably by continuous liquid interface production.

7. The method of claim 1, wherein said slicing, generating, and modifying steps are all carried out in a single computer processor.

8. The method of claim 1, wherein said object geometry data file is input by a local user, said library of procedural texture functions is input at least in part by a remote provider, and said object geometry data file is inaccessible to said remote provider.

9. The method of claim 1, wherein said object geometry data file does not include surface texture.

10. The method of claim 1, wherein said object geometry data file does not include internal features or structure.

11. An additive manufacturing system, comprising:
an additive manufacturing apparatus;
a processing device; and
a memory comprising instructions which, when executed by the processing device, cause the processing device to carry out operations comprising:
(a) slicing an object geometry data file to produce a rasterized image sequence;
(b) generating a signed distance field from said object geometry data file;
(c) selecting, from a library of procedural texture functions, a procedural texture function defining a continuous internal or external set of features; and
(d) modifying said rasterized image sequence to include said internal or external set of features based on said signed distance field to thereby produce a modified image sequence file.

12. A computer program product comprising a non-transitory computer readable storage medium having computer readable software code sections embodied in the medium, which software code sections are configured to be executed by a processor to carry out operations comprising:
(a) slicing an object geometry data file to produce a rasterized image sequence;
(b) generating a signed distance field from said object geometry data file;
(c) selecting, from a library of procedural texture functions, a procedural texture function defining a continuous internal or external set of features; and
(d) modifying said rasterized image sequence to include said internal or external set of features based on said signed distance field to thereby produce a modified image sequence file.

13. The computer program product of claim 12, wherein said library of procedural texture functions comprises solid texturing functions, cellular texturing functions, genetic texturing functions, self-organizing texture functions, and combinations thereof.

14. The computer program product of claim 12, wherein said object geometry data file is input by a local user, said library of procedural texture functions is input at least in part by a remote provider, and said object geometry data file is inaccessible to said remote provider.

15. The additive manufacturing system of claim 11, wherein the operations further comprise:
(e) producing a three-dimensional object on the additive manufacturing apparatus from said modified image sequence file, said three-dimensional object having said selected internal feature included therein and/or external feature included thereon.

16. The additive manufacturing system of claim 11, wherein said library of procedural texture functions comprises solid texturing functions, cellular texturing functions, genetic texturing functions, self-organizing texture functions, and combinations thereof.

17. The additive manufacturing system of claim 11, wherein said object geometry data file is input by a local user, said library of procedural texture functions is input at least in part by a remote provider, and said object geometry data file is inaccessible to said remote provider.

18. The additive manufacturing system of claim 11, wherein said object geometry data file does not include surface texture and/or internal features.

19. The method of claim 1, wherein said object geometry data file is separate from said library of procedural texture functions.

20. The method of claim 1, wherein said library of procedural texture functions comprises a plurality of procedural texture functions.

* * * * *